(12) United States Patent
Ptasinski et al.

(10) Patent No.: US 8,537,457 B1
(45) Date of Patent: Sep. 17, 2013

(54) PLASMONIC CORRELATION SPECTROMETER

(75) Inventors: Joanna Ptasinski, La Jolla, CA (US); Stephen D. Russell, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 334 days.

(21) Appl. No.: 13/111,124

(22) Filed: May 19, 2011

Related U.S. Application Data (63) Continuation-in-part of application No. 12/424,164, filed on Apr. 15, 2009, now Pat. No. 8,085,459.

(51) Int. Cl.
*G02F 1/00* (2006.01)

(52) U.S. Cl.
USPC .......................................................... 359/321

(58) Field of Classification Search
USPC .................. 359/247, 282, 321; 356/445, 448
See application file for complete search history.

(56) References Cited

U.S. PATENT DOCUMENTS

| | | | |
|---|---|---|---|
| 5,757,536 A | | 5/1998 | Ricco et al. |
| 5,917,607 A | * | 6/1999 | Naya ............................. 356/445 |
| 6,384,953 B1 | | 5/2002 | Russell et al. |
| 6,646,782 B1 | | 11/2003 | Russell et al. |
| 6,738,194 B1 | | 5/2004 | Ramirez et al. |
| 6,753,994 B1 | | 6/2004 | Russell |
| 7,194,175 B1 | | 3/2007 | Rodgers et al. |

OTHER PUBLICATIONS

U.S. Appl. No. 12/793,271 by Joanna N. Ptasinski et al., entitled "Plasmonic Router" filed Jun. 3, 2010, All.
U.S. Appl. No. 12/849,198 by Joanna N. Ptasinski et al., entitled "Plasmonic Logic Device" filed Aug. 3, 2010, All.
Sinclair, M.B. et al., Synthethic Infrared Spectra, Optics Letters, p. 1036, Jul. 1, 1997, vol. 22, No. 13, USA.
Sinclair, M.B. et al., Synthetic Spectra: A Tool for Correlations Spectroscopy, Applied Optics, p. 3342, May 20, 1997, vol. 36, No. 15, USA.

* cited by examiner

*Primary Examiner* — Joseph P Martinez
(74) *Attorney, Agent, or Firm* — Arthur K. Samora; Kyle Eppele

(57) ABSTRACT

A correlation spectrometer can include a sample cell, a plasmonic array, a light source that can be used to illuminate both the plasmonic array and the sample cell, and an infrared (IR) detector that is connected to the plasmonic array, and that is configured to receive and detect surface plasmons. The plasmonic array is modulated to transmit a surface plasmon at a predetermined resonance peaks that correspond to resonant peaks for a compound of interest (COI). If the COI is present in the sample cell, a surface plasmon having resonant peaks corresponding to the COI resonant peaks is generated in the plasmonic array and detected by the IR detector. The plasmonic can be formed with a plurality of nanoholes with different periodicities and fill factors, in order to detect multiple COI.

16 Claims, 6 Drawing Sheets

PLASMONIC CORRELATION SPECTROMETER

CROSS-REFERENCE TO RELATED APPLICATIONS

This application is a continuation-in-part of U.S. application Ser. No. 12/424,164, filed Apr. 15, 2009 now U.S. Pat. No. 8,085,459, entitled "Plasmonic Transistor". The '164 application is hereby incorporated by reference in its entirety.

FEDERALLY-SPONSORED RESEARCH AND DEVELOPMENT

This invention (Navy Case No. 100641) is assigned to the United States Government and is available for licensing for commercial purposes. Licensing and technical inquires may be directed to the Office of Research and Technical Applications, Space and Naval Warfare Systems Center, Pacific, Code 2112, San Diego, Calif. 92152; voice (619) 553-2778; email T2@spawar.navy.mil.

FIELD OF THE INVENTION

The present invention pertains generally to plasmonic devices. More particularly, the present invention pertains to plasmonic devices that manipulate surface plasmon phenomena to function as correlation spectrometers.

BACKGROUND OF THE INVENTION

Plasmons are quasiparticles resulting from the quantization of plasma oscillations, just as photons and phonons are quantizations of light and sound waves, respectively. Surface plasmons are those plasmons that are confined to surfaces and that interact strongly with light. They occur at the interface of a vacuum or material with a positive dielectric constant with that of a negative dielectric constant (usually a highly conductive material such as a metal or doped dielectric). Plasmonics is a field where one exploits the short wavelength of a surface plasmon in an analogous method as one exploits an optical wavelength for information transfer or data manipulation. But, rather than a quantum of light (a photon), a plasmon or collective excitation in the electron density is used.

Standoff detection is a detection method that can be used to identify dangerous solvents, chemicals, and explosives at safe distances from people and vital assets, in order to reduce the potential for severe damage. Standoff methods focus on chemical identification to detect explosives, breakdown products, and/or other precursors. Some of the major challenges for standoff detection include developing new methods that enable classification and identification of new and emerging threat chemical signatures from a distance. Correlation spectroscopy is one such method that could be used for standoff detection.

Correlation spectroscopy is a method used for sensing and analysis applications. The method consists of finding a correlation between the transmission of an unknown sample and the transmission of a reference cell that contains a known compound. Correlation spectroscopy works well for materials such as gases, because they exhibit narrow absorption bands and small modulations of the transmission of the reference cell can result in a large modulation on a beam. But for gases that are dangerous or hazardous, the use of correlation spectroscopy requires that a references cell that contains a dangerous material be proximate to the user, which is an undesirable situation.

A correlation spectrometer that is based on surface plasmon resonance could obviate the need for multiple reference cells containing the compounds of interest. This would obviate the need for the user to come into close contact with dangerous solvents, chemicals or explosives such as chemical-warfare agents present within a reference cell; it would also obviate the need to store a multitude of reference cells containing hazardous substances. In sum, plasmonic correlation spectrometers could overcome the disadvantages of the prior art.

In view of the above, it is an object of the present invention to provide a plasmonic correlation spectrometer that uses a plasmonic array in place of a reference cell for operation. Another object of the present invention is to provide a plasmonic correlation spectrometer with a greatly reduced size. Still another object of the present invention to provide a plasmonic correlation spectrometer that is amenable to fabrication on the chip scale for integrated photonic devices. Yet another object of the present invention to provide a plasmonic correlation spectrometer for standoff detection of hazardous materials that is much safer to use. Another object of the present invention to provide a plasmonic correlation spectrometer that is configured for the detection of more than one hazardous material at the same time.

SUMMARY OF THE INVENTION

A correlation spectrometer in accordance with several embodiments of the present invention can include a plasmonic array and a sample cell. The sample cell is not limited to a physical containment, but may be any volume of space that may contain a compound of interest (COI). The spectrometer can further include a light source, which can be used to illuminate both the plasmonic array and the sample cell. The spectrometer can further include an infrared (IR) detector that is connected to the plasmonic array, and that is configured to receive and detect the surface plasmon.

The correlation spectrometer according to several embodiments can further include a means for modulating the plasmonic array to transmit a surface plasmon at a predetermined resonance peak. In several embodiments, this can be accomplished by varying the angle of incidence of the light source upon the plasmonic array corresponding to a compound of interest. In other embodiments of the present invention, the plasmonic array can be modulated by causing a flow of various nontoxic gases or fluids having indices of refractions other that of the resonance peak that is of interest to the user. The plasmonic array is configured so that the surface plasmon exhibits resonance peaks similar to the compound of interest emission spectra when the compound of interest is present in the sample cell.

In several embodiments, the plasmonic correlation spectrometer can be formed with a plurality of nanoholes of different periodicities. The periodicities can be chosen for detection of a plurality of said resonant peaks, with each resonant peak corresponding to a respective periodicity. The periodicities can have a range from 380 nanometers to 10 micrometers. The range is determined by the materials used for the metallic layer of the plasmonic array. The range limits correspond to those resonant peaks for gold (Ag) and silver (Au), but a gold-silver alloy, as well as other metallic materials, could be used. Within the resonant peak range, the fill factor of the nanohole array can be chosen to provide resonant peaks of predetermined bandwidths. With this configuration, the same plasmonic correlation spectrometer can be configured to detect multiple compounds of interest.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, plasmonics is a field where one exploits the short wavelength of a surface plasmon in an analogous method as one exploits an optical wavelength for information transfer or data manipulation. But rather than a quantum of light (a photon), a plasmon or collective excitation in the electron density is used.

Figure 1:
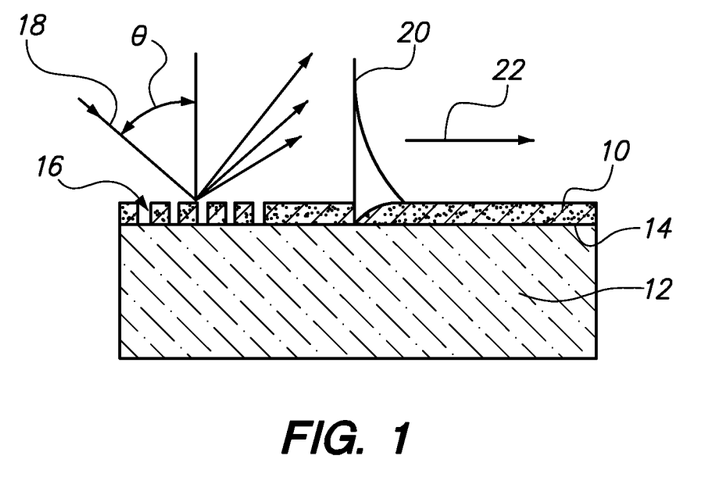
FIG. 1 is a greatly enlarged cross-sectional view of a dielectric or an electro-optic substrate and a conductive layer that generally shows the manner in which a grating can establish a surface plasmon at the substrate/conductive layer interface.
Figure 2:
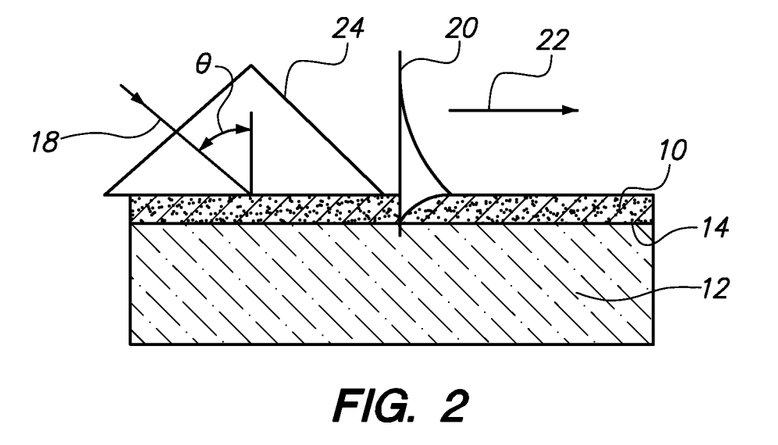
FIG. 2 is the same view as FIG. 1, but with a prism used to establish the surface plasmon instead of a grating.

To establish a surface plasmon, and referring initially to FIGS. 1 and 2, a conductive (usually metallic) layer 10 is placed on an electro-optic substrate 12 to establish an interface 14. One may couple light 18 from light source 19 into the thin conductive layer 10 to form a surface plasmon 20 (surface plasmon 20 is not to scale in FIGS. 1 and 2), which travels along interface 14 in the direction of arrow 22 under specific coupling conditions. These coupling conditions are given by Equation [1]:

$$k_{sp} = k\left(\frac{\varepsilon_m \varepsilon_d}{\varepsilon_m + \varepsilon_d}\right)^{1/2} = \frac{\omega}{c}\sqrt{\varepsilon_d}\sin\theta \quad [1]$$

Where $k_{sp}$ is the surface plasmon wave vector, k is the wave vector of the incident radiation, $\varepsilon_m$ is the permittivity of the conductive layer (for purposes of this disclosure, permittivity is defined as the ability to transmit, or "permit" an electric field), $\varepsilon_d$ is the permittivity of the electro-optic substrate, ω is the frequency at which coupling conditions occur and surface plasmon will propagate along interface 14, c is the speed of light and θ the angle (from vertical) at which coupling conditions will occur when light 18 impinges on the conductive layer.

There are well known methods of accomplishing this coupling of light 18 into conductive layer 10. For example, a plurality of grooves 16 can be formed in the conductive layer 10 as known in the art and as shown in FIG. 1. Alternatively, the coupling of light 18 could be accomplished using a high index prism 24 that is placed on conductive layer 10 to establish surface plasmon 20, as shown in FIG. 2. Other means that are known in the art can include establishing an aperture coupling. See for example, U.S. Pat. No. 6,646,782, which issued to Russell et al. for an invention entitled "Solid State Surface Plasmon Light Valve and Tunable Filter", and which is assigned to the same assignee as the present invention, where this is described for a tunable optical filter.

As yet another alternative for the coupling of light 18 into conductive layer 10, one may choose to integrate a light source 19 onto the plasmonic device for effective coupling using photonic silicon devices such as Russell et al., U.S. Pat. No. 6,093,941 entitled "Photonic Silicon on a Transparent Substrate" (25 Jul. 2000), or other semiconductor or organic light emitting structures or nanostructures. Alternatively, externally formed and operably coupled photonic devices may be integrated in a common package to the plasmonic device.

Figure 5:
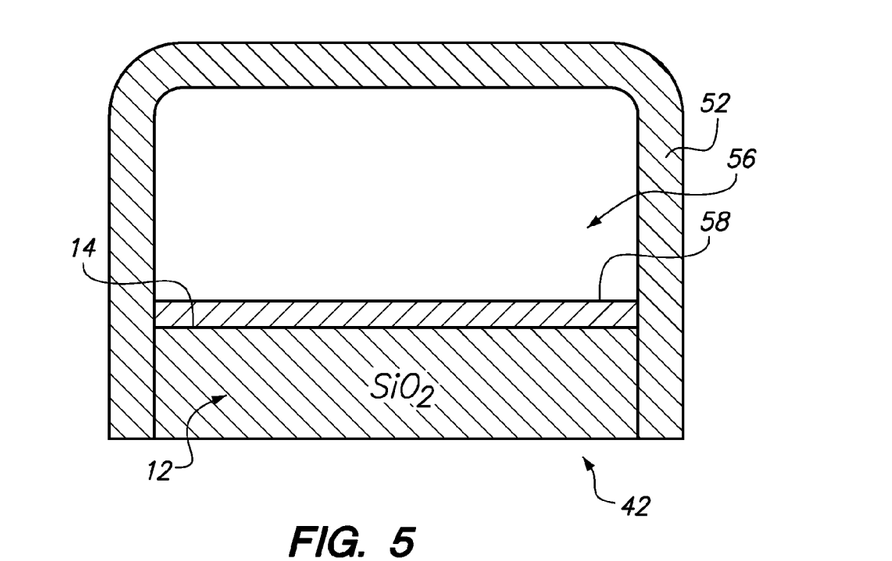
FIG. 5 is a cross-sectional diagram of the plasmonic array of the spectrometer of FIG. 4, which shows how non-toxic fluids can be used to modulate the plasmonic array for the plasmonic correlation spectrometer according to several embodiments.
Figure 6:
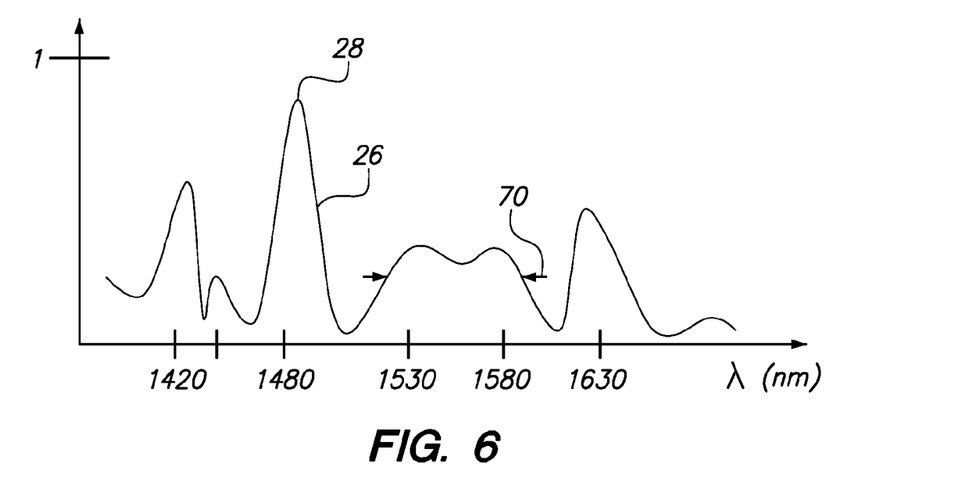
FIG. 6 is a graph of a spectral signature for a compound of interest, which illustrates the wavelengths at which resonant peaks can occur for the plasmonic correlation spectrometer of FIG. 4.

Once generated, a surface plasmon can be adapted to many purposes. Correlation spectroscopy is one such purpose. Referring briefly to FIG. 6, a spectrum signature 26 for an arbitrary compound of interest (COI) is shown. As shown in FIG. 5, the signature 26 will typically have a plurality of resonant peaks 28. The number and bandwidth of the resonant peaks 28, as well as the wavelength at which the peaks occur, can be used to identify the COI corresponding to the signature. The spectral signature can be generated by through the generation of light, but it can also be generated by the generations of surface plasmons, and this can be accomplished to identify COI through correlation spectroscopy, in the manners described more fully below.

Figure 3:
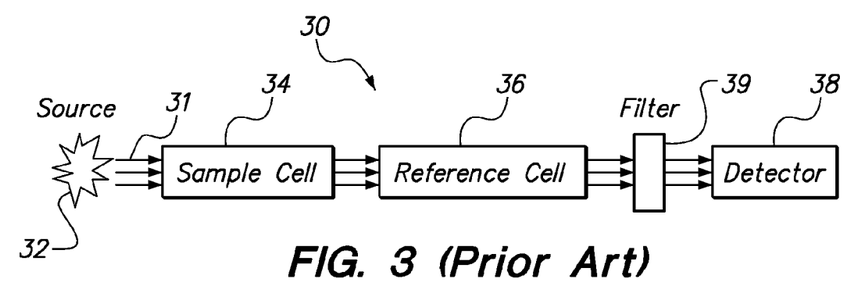
FIG. 3 is a block diagram of a correlation spectrometer of the prior art, which includes a reference cell containing the compound of interest to be detected.

A plasmonic correlation spectrometer according to several embodiments of the present invention is one such purpose. Referring now to FIG. 3, FIG. 3 shows a typical prior art correlation spectroscopy system 30 which relies on a reference cell 36. Light 31 from light source 32 passes through the sample cell 34 and then through the reference cell 36 containing a target species, with the light transmission through the system monitored by an IR detector 38 after passing through a filter 39 that removes non-resonant transmissions. In the prior art, if sample cell 34 contains the same compound of interest (COI) as reference cell 36, a spectral signature corresponding to the COI will be detected at IR detector 38.

Stated differently, if there is a correlation between the two, then a modulated output is detected and the corresponding sample target is identified as containing the target species. But, the prior art requires that reference cells 36 that contain COI be available to the user (not shown). For COI that are hazardous to humans and property, it can be undesirable for the user to carry and transport such reference cells 36, particularly when the user is located in a remote location.

Figure 4:
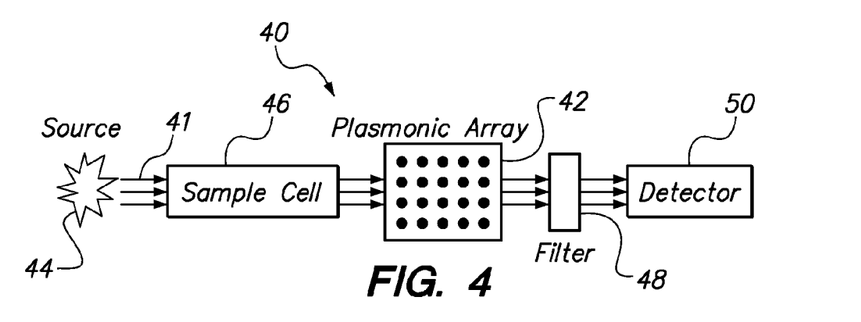
FIG. 4 is a block diagram of a plasmonic correlation spectrometer according to several embodiments of the present invention.

In FIG. 4, a correlation spectroscopy system 40 according to several embodiments of the present invention can be depicted. As shown in FIG. 4, the system 40 can include a plasmonic array 42 in the place of a prior art reference cell 36 for the prior art correlation spectrometers. Light 41 from light source 44 passes through a sample cell 46 and through the plasmonic array 42. After passing through plasmonic array 42, light from source 44 can be filtered to remove non-resonant transmissions by filter 48 and then be detected by detector 50 (detector 50 can be an infrared (IR) or other type of detector). To operate in this manner, however, the plasmonic array 42 must be modulated so that surface plasmons 20 can be generated at peaks that correspond to the resonant peaks 28 of the spectral signature 26 of the COI. The manners in which the plasmonic array 42 can be modulated can be described more fully below.

In several embodiments, and referring now to FIG. 5, the plasmonic array can be modulated by establishing a flow of non-toxic fluid 56 across plasmonic array 51. To do this, a conduit 52 can be positioned over conductive layer 54, and a flow of non-toxic fluid 56 can be established over conductive layer 10. When this occurs, non-toxic fluid 56 functions as a dielectric layer, and fluid 56 cooperates with conductive layer 10 to establish an interface 58 between fluid 56 and conductive layer 10 for selective transmission of surface plasmons. For these embodiments, the non-toxic fluid 56 can be chosen so that surface plasmons 20 are generated at resonant peaks that correspond to COI. A plurality of various non-toxic fluids can be used, which exhibit different indices of refraction.

In several embodiments of the present invention, plasmonic array 42 may also be modulated by varying the permittivity of the electro-optic layer 12, or by tuning the angle of the incident beam. This manner in which this is accomplished is described fully in U.S. patent application Ser. No. 12/424,164, filed Apr. 15, 2009, entitled "Plasmonic Transistor". The '164 application is hereby incorporated by reference in its entirety. By varying the qualities of the voltage source and/or the light source as described in the '164 application, the permittivity of electro-optic layer 12 can be manipulated so that surface plasmons propagate at wavelengths that correspond to the resonant peaks 28 for the COI to be identified. When this occurs, the material in sample call 46 will be identified as containing the spectral signature of the species replicated by the plasmonic array.

Figure 7:
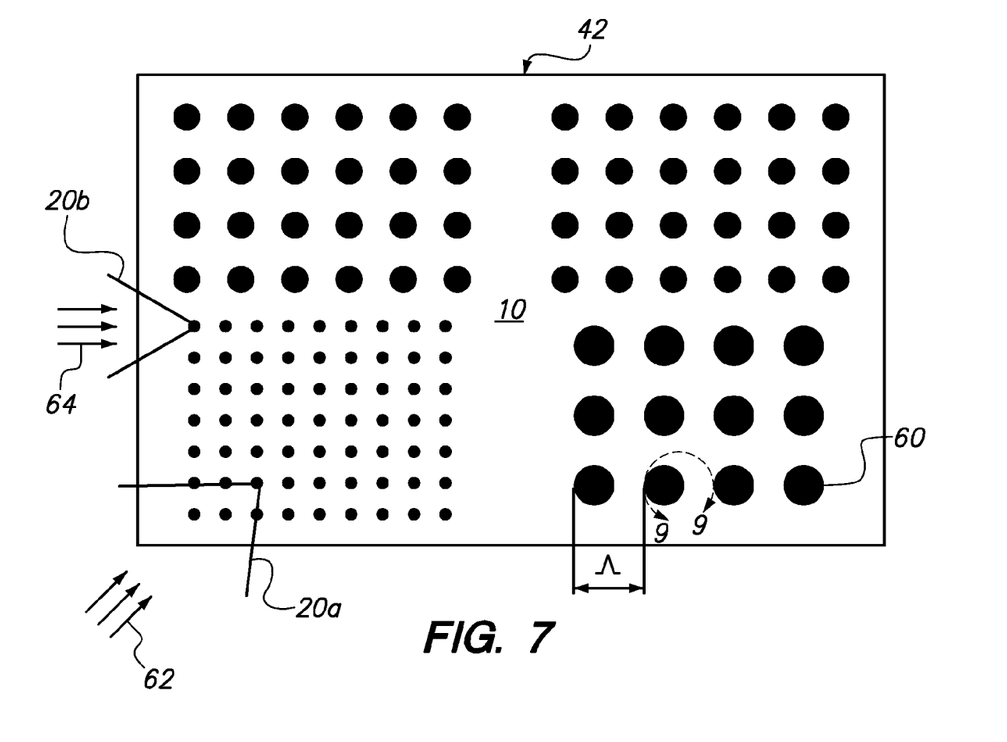
FIG. 7 is a top plan view of the plasmonic array for the spectrometer of FIG. 4, which illustrates that arrangement of nanoholes in greater detail.

For several embodiments of the present invention, it may be desirable to modulate the plasmonic array 42 in a manner that allows for detection of several COI at the same time. To do this, and referring now primarily to FIG. 7, patterning nanoholes 60 (which function as gratings 16 when the plasmonic array is illuminated) can be formed in the plasmonic array conductive layer 10 with various periodicities $\Lambda$, which allows for an extended range of detection as the surface plasmon dispersion relation is dependent upon the grating period of the array. The surface plasmon dispersion relationship can be expressed as:

$$k_{SPP} = k_\| + mk_G$$

$$\text{Re}\left\{\frac{2\pi}{\lambda}\sqrt{\frac{\varepsilon_d \varepsilon_m}{\varepsilon_d + \varepsilon_m}}\right\} = \frac{2\pi}{\lambda}\sin\theta + m\frac{2\pi}{\Lambda}$$

where $k_\|$ is the parallel wavevector, m is the diffraction order, and $k_G$ is the grating wavevector. $\Lambda$ refers to the grating period of the metallic array, $\lambda$ is wavelength of incident light, $\varepsilon_d$ is the permittivity of the dielectric and $\varepsilon_m$ is the permittivity of the metal. By forming nanoholes with different periodicities $\Lambda$ as shown in FIG. 7, surface plasmons can be transmitted at multiple wavelengths at the same time. The multiple wavelengths can correspond to different resonant peaks 28 that can correspond to unique resonant peaks of different COI; or, the multiple wavelengths can correspond to multiple resonant peaks that can correspond to the same COI, as depicted in FIG. 6. With this configuration, multiple resonant peaks can be detected.

Different plasmon modes may be used in order change the direction of travel of the surface plasmon 20 to shift and/or extend the detection range of the surface plasmons. Plasmon modes can be defined by the direction in which the surface plasmon wave travels along the grating. For example, and referring back to FIG. 7 for nanoholes 60 that are arranged in a rectangular grid, surface plasmon wave 20a (greatly exaggerated in size in FIG. 7) can travel obliquely across the grid of nanoholes, as indicated by arrows 62. This can be defined as the (1, 1) or (−1, −1) mode, depending on the arrows 62 (Arrows 62 are indicating (1,1) mode in FIG. 7). Or, the surface plasmon waves can travel across the grid in alignment with the rows and columns of the grid of nanoholes, as indicated by arrows 64 in FIG. 7. Travel of the surface plasmon waves 20b in these cases can be defined as (1,0), (0,1), (0, −1) and (−1, 0) modes; in FIG. 7, arrows 64 define the (1,0) mode.

Figure 8:
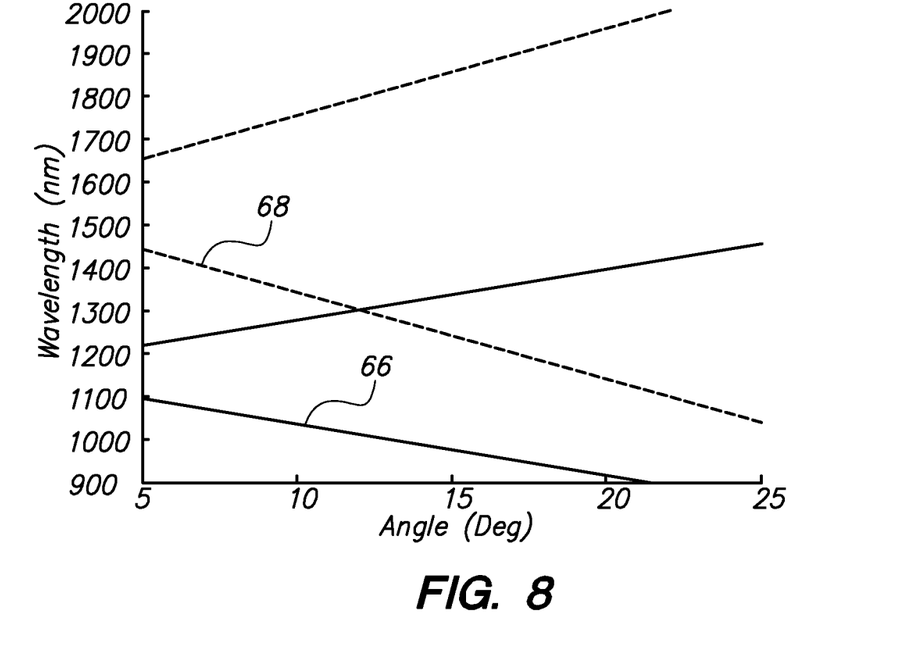
FIG. 8 is a graph that illustrates how the operating wavelength range of the plasmonic array can be shifted by manipulating the direction of travel of the generated surface plasmon.

FIG. 8 illustrates the manner in which the mode of propagation of the surface plasmons 20 affects the wavelengths of surface plasmon transmission for different angle of incidence 6 of light 41. As shown in FIG. 8, plasmon dispersion relation 66 occurs when the surface plasmon travels in the direction indicated by arrows 62 in FIG. 7, or in modes (1, 1) and (−1, −1). Similarly, plasmon dispersion 68 occurs when the surface plasmon is traveling in the direction indicated by arrows 64, i.e., in the (1, 0) mode. Thus, by manipulating the direction of travel of the surface plasmon, the wavelength range can be shifted according to several embodiment to conform the range of the spectral signature 26 of the COI that is to be identified.

Figure 9:
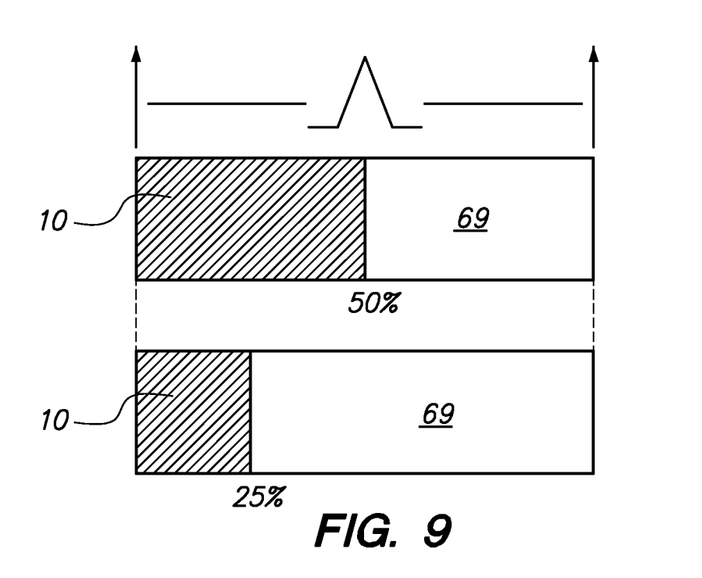
FIG. 9 is a greatly enlarged cross-sectional view of the metallic layer of the plasmonic array of FIG. 8, which illustrates the fill factor for the plasmonic array.

In several embodiments, and referring now to FIG. 9, the fill factor for the plasmonic array can be manipulated to cause a desired resonant peak width, as indicated by arrows 70 in FIG. 6. As shown in FIG. 9, for the periodicity $\Lambda$ of nanoholes 60, the fill factor can be defined as the ratio of the conductive layer material 10 to the dielectric layer material 69 within the periodicity.

Figure 10:
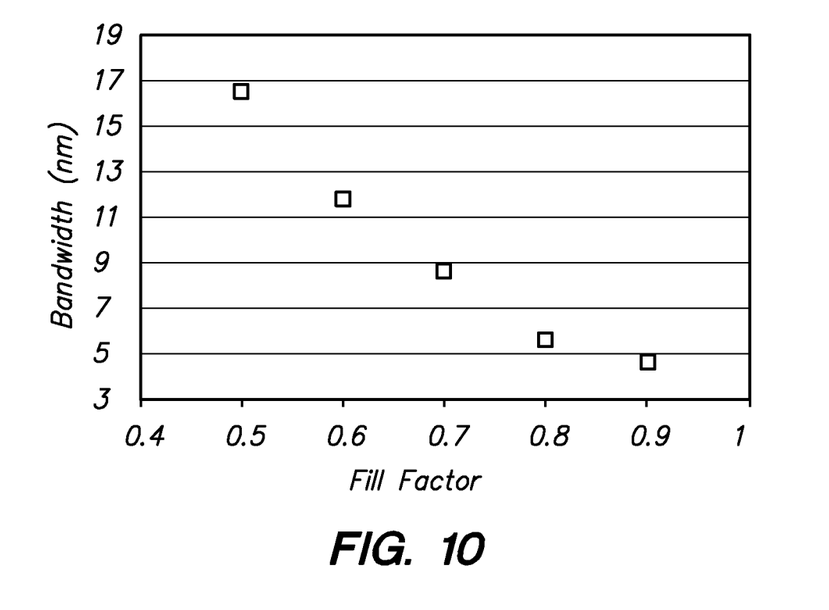
FIG. 10 is a graph that depicts how manipulation of the fill factor of FIG. 9 can change the bandwidth of the detected resonant peaks.

FIG. 10 is a graph of fill factor versus resonant peak bandwidth for a fourteen hundred nanometer periodicity ($\Lambda$=1400 nm) using gold (Au) as conductive layer 14. As shown in FIG. 10, the fill factor can be varied to manipulate the width of resonant peaks 28, so the resonant peaks of the transmitted surface plasmon correspond more closely to the resonant peaks 28 of the COI, not only in number and location (wavelength along the spectral signature 26), but also in the width of the resonant peaks. This allows for more effective correlation of the resonant peaks of the COI in sample cell when the plasmonic array 42 is modulated in this manner.

It should be appreciated that the various means in which the plasmonic array 42 can be modulated as described above can be used singly, or in conjunction with each other, as desired by the user to correlation with spectral signatures of varying complexity, or to correlate spectral signatures of multiple COI for simultaneously by the device according to several embodiments of the present invention.

Figure 11:
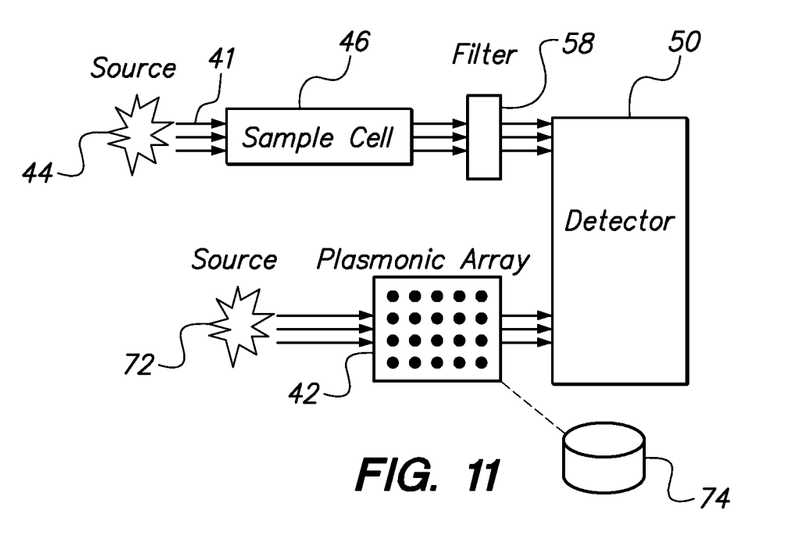
FIG. 11 is an alternative embodiment of the plasmonic correlation spectrometer of FIG. 4; and, FIG. 12 is a block diagram that is representative of steps that can be taken to practice the methods of the present invention according to several embodiments.

Referring now to FIG. 11, several alternative embodiments of the present invention can be shown. FIG. 11 depicts a configuration for the plasmonic correlation spectrometer 40 wherein a second light source 72 is present. For these embodiments, a spectral signature is received from sample cell 46 at detector 50. Light source 72 is used to active plasmonic array 42 after some or all of the modulation techniques are described above have occurred. The modulation causes surface plasmon to be received at the detector 50.

For these embodiments, the detector can incorporate a non-transitory computer readable medium containing computer instructions stored therein for causing a computer processor (not shown in FIG. 11) to: 1) Access a database 74 of spectral signatures; 2) Modulate the plasmonic array according to a chosen spectral signature chosen from database 74 to cause the surface plasmon to propagate with the characteristics of the chosen spectral signature; 3) Analyze the spectral signal received from the COI contained in sample cell 46 to the spectral signature 26 of the surface plasmon received from plasmonic array, 4) Determine whether (or not) the two spectral signatures correspond to each other to identify the COI; and, 5) Alert the user once the COI is identified, or if the spectrometer according to these embodiments is unable to identify the COI. The alert can be visual or audible or via any means as known in the art to communicate the results of the analysis to the user.

For the materials according to several embodiments of the present invention, Al, Au, Rh, Al, metal alloys and other highly conductive materials can be used for the metallic layers. For materials of the electro-optic substrate, lithium niobate (LiNbO3), strontium barium niobate (SBN), lead zirconate tantalate (PZT), lanthanum doped lead zirconate tantalate (PLZT), zinc oxide (ZnO), potassium dihydrogen phosphate (KDP), and the like which includes electro-optic ceramics with the titanate, tantalate, zirconate compositions and also electro-optic polymers and polymer gelatins. The substrates may also be composed of a concatenation of layers, and therefore may also include electro-optic liquid crystals confined between other layers. Wavelength range can be selected from: visible wavelengths, near-infrared wavelengths.

The surface plasmon correlation spectrometer may be designed to incorporate photonic bandgap engineering, as desired, to improve isolation between plasmonic devices to avoid "cross-talk." See for example U.S. Pat. No. 7,194,175 by Rodgers et al. for an invention entitled "Photonid Bandgap Device in SOI", Navy Case No. 097719.

The surface plasmon correlation spectrometer may also be used in reflection mode to duplicate the absorption spectra of chemical agents.

The invention as described is used in a passive, stand-off detection scheme. Alternately, the invention may be used in an active mode where the target sample is illuminated by an optical beam and the resulting emission spectra is detected and correlated with the surface plasmon array The surface Plasmon correlation spectrometer of the current invention is focused on detection of chemical species, but this may also be extended in some situation to biological species where a correlation can be detected between a target source and the plasmonic array. For example, many biological species have strong polarization dependence due to their asymmetrical structure. The combination of polarization properties and absorption/emission properties may also be analyzed by this invention by insertion of polarizing filters to analyze the signatures prior to detection.

Figure 12:
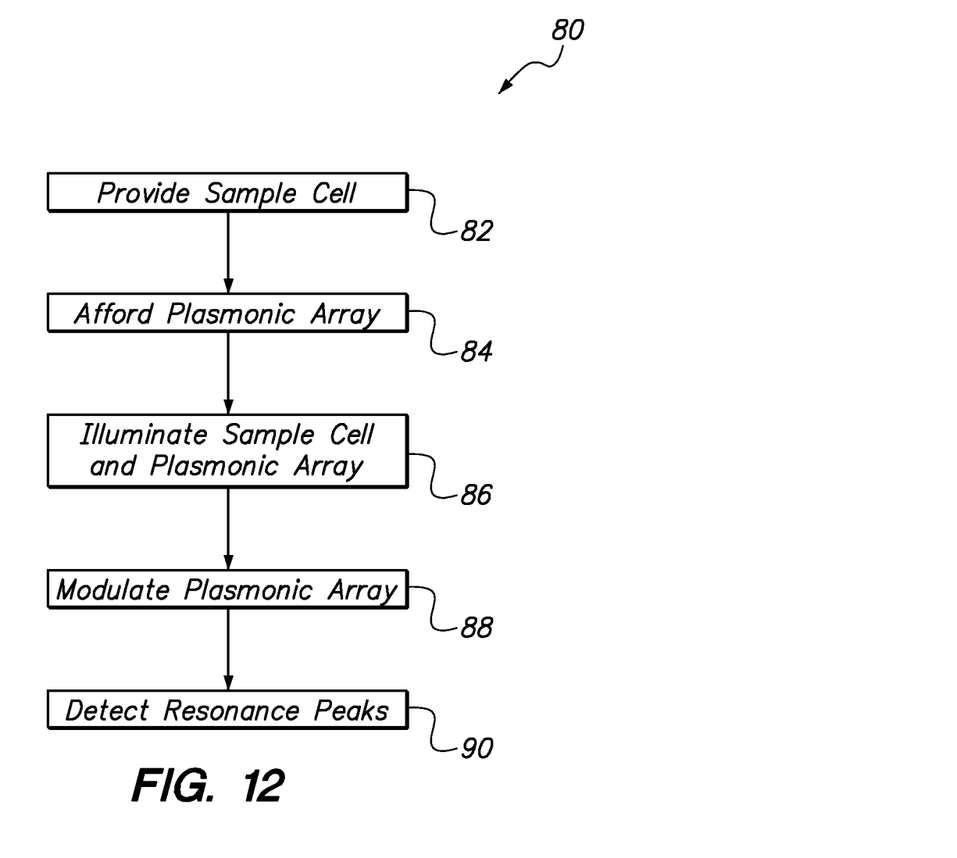

FIG. 12 schematically describes the plasmonic correlation spectroscopy methods according to several embodiments of the present invention. As shown in FIG. 12, the methods 80 can include the initial step 82 of providing a sample cell 46 that contains a COI to be identified. Sample cell 46 is not limited in scope to a physical containment device, but may be any volume of space that is interrogated or sampled for presence of COI by the herein described invention. The methods of several embodiments can further include the step of affording a plasmonic array 42, as indicated by block 84 in FIG. 12. Next, the sample cell 46 and plasmonic array 42 can be illuminated, as depicted by step 86 in FIG. 12. This can be accomplished with the same light source 44 in certain embodiments, as shown in FIG. 4, or with different light sources 44, 72 in other embodiments, as shown in FIG. 11. Next, and as indicated by step 88 the plasmonic array can be modulated using various combinations of the modulation structure and cooperation of structure as described above. This generates a surface plasmon with spectral signature having resonant peak(s). If the resonant peaks of the surface plasmon are detected by the detector 50, as indicated by step 90 in FIG. 12, and those peaks correspond to the resonant peaks of the COI spectral signature, that the COI has been identified. For some embodiments that use multiple light sources. The spectral signatures from the COI and the plasmonic may need to be compared, in some cases by computer software as described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A correlation spectrometer comprising:
   a plasmonic array:
   a sample cell;
   a light source illuminating said plasmonic array and said sample cell;
   means for modulating said plasmonic array to transmit a surface plasmon having at least one predetermined resonance peak corresponding to a compound of interest, said predetermined resonance peak occurring when said compound is interest (COI) is present in said sample cell, and,
   wherein said modulating means comprises placing said plasmonic array through a flow of various nontoxic fluids to create resonance peaks at different wavelengths than that of said predetermined resonance peak.

2. The spectrometer of claim 1 wherein said modulating means comprises varying the angle of incidence of said light source upon said plasmonic array.

3. The spectrometer of claim 1 further comprising an infrared (IR) detector connected to said plasmonic array and configured for receiving said surface plasmon at said resonance peak.

4. The spectrometer of claim 1 wherein said plasmonic array is formed with a plurality of nanoholes.

5. The spectrometer of claim 4 wherein said nanoholes are spaced-apart with at a plurality of periodicities for detection of a plurality of said resonant peaks, each said resonant peak corresponding to a respective periodicity.

6. The spectrometer of claim 5 wherein said periodicity has a range from 380 nanometers to 10 micrometers.

7. The spectrometer of claim 6 wherein said nanoholes are formed with a predetermined fill factor that is chosen to yield a predetermined bandwidth for said predetermined resonant peak.

8. The spectrometer of claim 6 wherein said modulating means comprises orienting said light source in a mode selected from (1, 0), (−1,0), (0, 1), (0, −1), (1,1) and (−1, −1) modes.

9. A method of conducting correlation spectroscopy comprising the steps of:
   A) providing a sample cell with a compound of interest;
   B) affording a plasmonic array;
   C) illuminating said sample cell and said plasmonic array with a light source;
   D) modulating said plasmonic array so that a surface plasmon propagates along said plasmonic array at a predetermined resonance peak that corresponds to said compound of interest, and;
   wherein said step D) is accomplished by establishing a flow of various nontoxic fluids having indices of refractions other than said resonance peak corresponding to said compound of interest.

10. The method of claim 9 wherein said step D) is accomplished by varying the angle of incidence of said light source upon said plasmonic array.

11. The method of claim 9 wherein said step D) is accomplished by orienting said light source in a mode selected from (1, 0), (−1,0), (0, 1), (0, −1), (1,1) and (−1, −1) modes.

12. The method of claim 9 further comprising the step of:
   E) detecting said resonance peak with an infrared (IR) detector connected to said plasmonic array.

13. The method of claim 9 wherein said step B) is accomplished with an plasmonic array that is formed with a plurality of nanoholes.

14. The method of claim 13 wherein said nanoholes are spaced-apart at various periodicities for detection of a plurality of said resonant peaks, each said resonant peak corresponding to a respective periodicity.

15. The method of claim 14 wherein said periodicity has a range from 380 nanometers to 10 micrometers.

16. The method of claim 13 wherein said nanoholes are formed with a predetermined fill factor that is chosen to yield a predetermined bandwidth for said predetermined resonant peak.

* * * * *